(12) United States Patent
Yang

(10) Patent No.: US 11,756,224 B2
(45) Date of Patent: Sep. 12, 2023

(54) CIRCLE CENTER DETECTION IN IMAGERY

(71) Applicant: BOE TECHNOLOGY GROUP CO., LTD., Beijing (CN)

(72) Inventor: Jinglin Yang, Beijing (CN)

(73) Assignee: BOE TECHNOLOGY GROUP CO. LTD., Beijing (CN)

( * ) Notice: Subject to any disclaimer, the term of this patent is extended or adjusted under 35 U.S.C. 154(b) by 488 days.

(21) Appl. No.: 16/966,611

(22) PCT Filed: Jun. 27, 2019

(86) PCT No.: PCT/CN2019/093356
§ 371 (c)(1),
(2) Date: Jul. 31, 2020

(87) PCT Pub. No.: WO2020/258184
PCT Pub. Date: Dec. 30, 2020

(65) Prior Publication Data
US 2022/0398761 A1    Dec. 15, 2022

(51) Int. Cl.
*G06T 7/60* (2017.01)
*G06T 7/73* (2017.01)
*G06T 7/13* (2017.01)

(52) U.S. Cl.
CPC ............. *G06T 7/60* (2013.01); *G06T 7/13* (2017.01); *G06T 7/73* (2017.01)

(58) Field of Classification Search
CPC .... G06T 7/10; G06T 7/12; G06T 7/13; G06T 7/70–77; G06T 7/60
(Continued)

(56) References Cited

U.S. PATENT DOCUMENTS 6,021,222 A   2/2000 Yamagata
9,053,389 B2  6/2015 Poyil et al.

FOREIGN PATENT DOCUMENTS

CN   103854279 A   6/2014
CN   104778707 A   7/2015
(Continued)

OTHER PUBLICATIONS

Yang, Qing, and Bahram Parvin. "Perceptual organization of radial symmetries." Proceedings of the 2004 IEEE Computer Society Conference on Computer Vision and Pattern Recognition, 2004. CVPR 2004., vol. 1. IEEE, 2004. (Year: 2004).*
(Continued)

*Primary Examiner* — Ian L Lemieux
(74) *Attorney, Agent, or Firm* — Dilworth & Barrese, LLP.; Michael J. Musella, Esq.

(57) ABSTRACT

The invention discloses an image detection method, apparatus, device and a medium. The method includes: determining one or more edge points in an input image and gradient directions thereof; generating an initial matrix with the same size as the input image, and assigning the same initial value to all matrix elements in the initial matrix; for each pixel point located in an accumulation region of each edge point, assigning a corresponding accumulation value to a matrix element in the initial matrix corresponding to the pixel point, to obtain an accumulation matrix; determining one or more circle-center positions in the input image based on the accumulation matrix; wherein, the accumulation region of each edge point includes a first direction line for accumulation along the gradient direction of the edge point and a second direction line for accumulation along the direction opposite to the gradient direction of the edge point.

15 Claims, 5 Drawing Sheets

(58) Field of Classification Search
USPC .......................................................... 382/103
See application file for complete search history.

(56) References Cited

FOREIGN PATENT DOCUMENTS

| CN | 107507185 A | * | 12/2017 | ............ G06T 5/002 |
| CN | 107507185 A | | 12/2017 | |

OTHER PUBLICATIONS

Loy, Gareth, and Alexander Zelinsky. "Fast radial symmetry for detecting points of interest." IEEE Transactions on pattern analysis and machine intelligence 25.8 (2003): 959-973. (Year: 2003).*

Barnes, Nick, Alexander Zelinsky, and Luke S. Fletcher. "Real-time speed sign detection using the radial symmetry detector." IEEE Transactions on Intelligent Transportation Systems 9.2 (2008): 322-332. (Year: 2008).*

Jia, Li-Qin, et al. "An effective non-HT circle detection for centers and radii." 2011 International Conference on Machine Learning and Cybernetics. vol. 2. IEEE, 2011. (Year: 2011).*

* cited by examiner

CIRCLE CENTER DETECTION IN IMAGERY

TECHNICAL FIELD

The present disclosure relates to the field of image processing, in particular to an image detection method, an image detection apparatus, an image detection device and a medium.

BACKGROUND

With the wide application of image processing in civil and commercial fields, image detection plays an increasingly important role in intelligent video monitoring, automatic driving, and unmanned supermarkets, so there are higher requirements for the image detection.

At present, in the image detection, the Hough transform method is often used to process an input image to obtain a circle-center position in the image. However, when the Hough transform is used, on the one hand, the amount of calculation is very large, which results in a slow calculation speed; on the other hand, because this method realizes the detection of the circle-center position through edge points, when edges of a target are fuzzy or incomplete, accuracy of the detection will decrease.

Therefore, an image detection method with a high accuracy of the image detection is needed on the premise of realizing the detection of the circle-center position.

SUMMARY

In view of the above problems, the present disclosure provides an image detection method, an image detection apparatus, an image detection device and a medium. With the image detection method provided by the present disclosure, the accuracy of the image detection can be effectively improved and the image detection of high-precision can be realized on the premise of realizing the detection of the circle-center position, and the method has a good robustness.

According to an aspect of the present disclosure, an image detection method is provided. The image detection method comprises: determining one or more edge points in an input image and gradient directions of the one or more edge points; generating an initial matrix with a same size as the input image, and assigning a same initial value to all matrix elements in the initial matrix; for each edge point, for each pixel point located in an accumulation region of the edge point, assigning a corresponding accumulation value to a matrix element in the initial matrix that is corresponding to the pixel point, to obtain an accumulation matrix; determining positions of one or more circle-centers in the input image based on the accumulation matrix; wherein, for each edge point, the accumulation region of the edge point includes a first direction line for accumulation along a gradient direction of the edge point and a second direction line for accumulation along a direction opposite to the gradient direction of the edge point.

In some embodiments, the accumulation region comprises: a first accumulation region with a first direction line for accumulation as a central line and with a deflection angle from the first direction line for accumulation that is less than or equal to a first angle threshold; and a second accumulation region with a second direction line for accumulation as the central line and with a deflection angle from the second direction line for accumulation that is less than or equal to a second angle threshold.

In some embodiments, the step of, for each edge point, for each pixel point located in the accumulation region of the edge point, assigning the corresponding accumulation value to the matrix element in the initial matrix that is corresponding to the pixel point, to obtain the accumulation matrix, comprises: calculating an absolute value of a deflection angle of each pixel point in the accumulation region from a first direction line for accumulation and an absolute value of a deflection angle of the pixel point from a second direction line for accumulation to obtain a first deflection angle and a second deflection angle respectively, and setting the smaller one of the first deflection angle and the second deflection angle as an accumulation angle of the pixel point; obtaining an accumulation weight value corresponding to the pixel point based on the accumulation angle of the pixel point; and obtaining the accumulation value of the pixel point based on the accumulation weight value and an accumulation reference value.

In some embodiments, the step of determining positions of one or more circle-centers in the input image based on the accumulation matrix comprises: obtaining one or more local extreme points of accumulation values in the accumulation matrix; and determining the positions of one or more circle-centers in the input image based on the one or more local extreme points.

In some embodiments, the step of determining the positions of one or more circle-centers in the input image based on the accumulation matrix further comprises: comparing each accumulation value in the accumulation matrix with a circle-center detection threshold; and determining one or more accumulation values greater than the circle-center detection threshold, and determining positions of one or more circle-centers in the input image based on the one or more accumulation values.

In some embodiments, the step of determining one or more edge points in the input image comprises: comparing a gradient value of each pixel point in the input image with an edge detection threshold; and determining pixel points whose gradient value are greater than the edge detection threshold as edge points.

In some embodiments, the step of obtaining the accumulation weight value corresponding to the pixel point based on the accumulation angle of the pixel point comprises: establishing a Gaussian function based on the accumulation angle of the pixel point; and calculating the accumulation weight value corresponding to the pixel point based on the Gaussian function.

According to another aspect of the present disclosure, an image detection apparatus is provided. The image detection apparatus includes: an edge point determination module configured to determine one or more edge points in an input image and gradient directions of the one or more edge points; an initial matrix generation module configured to generate an initial matrix with a same size as the input image, and assign a same initial value to all matrix elements in the initial matrix; an accumulation matrix generation module configured to: for each edge point, for each pixel point located in an accumulation region of the edge point, assign a corresponding accumulation value to a matrix element in the initial matrix that is corresponding to the pixel point, to obtain an accumulation matrix; and a circle-center position determination module configured to determine positions of one or more circle-centers in the input image based on the accumulation matrix; wherein, for each edge point, the accumulation region of the edge point includes a first direction line for accumulation along a gradient direction of the edge point and a second direction line for accumulation along a direction opposite to the gradient direction of the edge point.

In some embodiments, the accumulation region comprises: a first accumulation region with a first direction line for accumulation as a central line and with a deflection angle from the first direction line for accumulation that is less than or equal to a first angle threshold; and a second accumulation region with a second direction line for accumulation as the central line and with a deflection angle from the second direction line for accumulation that is less than or equal to a second angle threshold.

In some embodiments, the accumulation matrix generation module comprises: an accumulation angle calculation module configured to calculate an absolute value of a deflection angle of each pixel point in the accumulation region from a first direction line for accumulation and an absolute value of a deflection angle of the pixel point from a second direction line for accumulation to obtain a first deflection angle and a second deflection angle respectively, and set the smaller one of the first deflection angle and the second deflection angle as an accumulation angle of the pixel point; an accumulation weight value generation module configured to obtain an accumulation weight value corresponding to the pixel point based on the accumulation angle of the pixel point; and an accumulation value output module configured to obtain the accumulation value of the pixel point based on the accumulation weight value and an accumulation reference value.

According to another aspect of the present disclosure, an image detection device is provided. The image detection device comprises a processor and a memory, and the memory includes a set of instructions that when executed by the processor, cause the image detection device to perform operations, the operations comprising: determining one or more edge points in an input image and gradient directions of the one or more edge points; generating an initial matrix with a same size as the input image, and assigning a same initial value to all matrix elements in the initial matrix; for each edge point, for each pixel point located in an accumulation region of the edge point, assigning a corresponding accumulation value to a matrix element in the initial matrix that is corresponding to the pixel point, to obtain an accumulation matrix; and determining positions of one or more circle-centers in the input image based on the accumulation matrix; wherein, for each edge point, the accumulation region of the edge point includes a first direction line for accumulation along the gradient direction of the edge point and a second direction line for accumulation along a direction opposite to the gradient direction of the edge point.

In some embodiments, the accumulation region comprises: a first accumulation region with a first direction line for accumulation as a central line and with a deflection angle from the first direction line for accumulation that is less than or equal to a first angle threshold; and a second accumulation region with a second direction line for accumulation as the central line and with a deflection angle from the second direction line for accumulation that is less than or equal to a second angle threshold.

In some embodiments, the operation of for each edge point, assigning the corresponding accumulation value to each pixel located in the accumulation region of the edge point to obtain the accumulation matrix comprises: calculating an absolute value of a deflection angle of each pixel point in the accumulation region from a first direction line for accumulation and an absolute value of a deflection angle of the pixel point from a second direction line for accumulation to obtain a first deflection angle and a second deflection angle respectively, and setting the smaller one of the first deflection angle and the second deflection angle as an accumulation angle of the pixel point; obtaining an accumulation weight value corresponding to the pixel point based on the accumulation angle of the pixel point; and obtaining the accumulation value of the pixel point based on the accumulation weight value and an accumulation reference value.

According to another aspect of the present disclosure, a computer-readable storage medium is provided, computer-readable instructions are stored on the computer-readable storage medium, and when the instructions are executed by a computer, the aforementioned method is executed.

BRIEF DESCRIPTION OF THE DRAWINGS

In order to more clearly describe technical solutions of the embodiments of the present disclosure, drawings needed in the description of the embodiments or the prior art will be briefly introduced in the following. Obviously, the drawings in the following description are only some embodiments of the present disclosure, and for those skilled in the art, other drawings can be obtained according to these drawings without inventive labor. The following drawings are not deliberately scaled to actual size, but the drawings focus on illustrating the main idea of the present disclosure.

DETAILED DESCRIPTION

The technical solutions in the embodiments of the present disclosure will be described clearly and completely with reference to the attached drawings. Obviously, the described embodiments are only partial embodiments of the present disclosure, not all embodiments. Based on the embodiments of the present disclosure, all other embodiments obtained by those of ordinary skill in the art without inventive labor are within the protection scope of the present disclosure.

As shown in the description and claims, unless the context clearly suggests exceptional circumstances, the words "a", "an", and/or "the" do not mean singular meanings, but may also include the plural meanings. Generally speaking, the terms "including" and "comprising" only imply that steps and elements that have been clearly identified are included, but these steps and elements do not constitute an exclusive list, and methods or devices may also include other steps or elements.

Although the disclosure makes various references to some modules in the system according to embodiments of the disclosure, any number of different modules can be used and operate on user terminals and/or servers. The modules are illustrative only, and different modules may be used for different aspects of the system and method.

Flowcharts are used in the present disclosure to illustrate the operations performed by the system according to the embodiments of the present disclosure. It should be understood that the preceding or following operations are not necessarily performed accurately in sequence. On the contrary, the various steps can be processed in a reverse order or simultaneously as required. At the same time, other operations can be added to these processes, or one step or several steps can be removed from these processes.

Figure 1A:
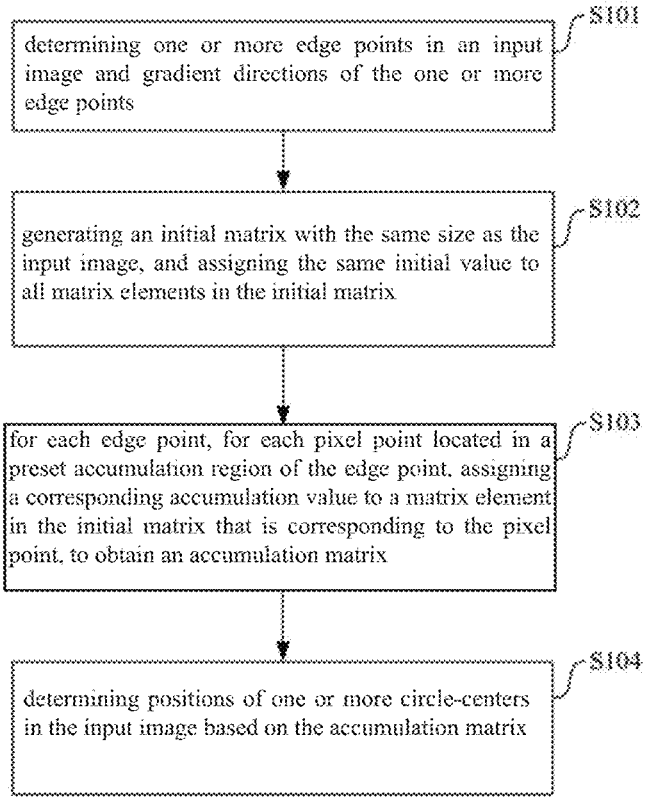
FIG. 1A illustrates an exemplary flowchart of an image detection method (100) according to an embodiment of the present disclosure.

FIG. 1A illustrates an exemplary flowchart of an image detection method (100) according to an embodiment of the present disclosure.

At first, in step S101, one or more edge points in an input image and gradient directions of the one or more edge points are determined.

The input image may be an image captured in real time by a camera or a video recording apparatus, or may be an image obtained in other manners in advance. The embodiments of the present disclosure are not limited by the source and acquisition manner of the input image. For example, the input image can be an image taken directly by a road camera, a monitor camera of an unmanned supermarket, or an image obtained after pre-processing by a computer.

The input image may be a color image or a gray-scale image, and the embodiments of the present disclosure are not limited by the image type of the input image.

For example, in the input image, if the pixel values of surrounding pixel points of a certain pixel point change dramatically, the certain pixel point can be determined as an edge point. Therefore, the gradient value of the edge point will be significantly greater than the gradient values of the surrounding pixel points, and the gradient direction of the edge point characterizes the direction for the pixel value to increase.

In some embodiments, based on image contents of the input image, for example, one pixel point in the input image can be determined as one edge point, and then one edge point can be obtained, or a plurality of pixel points in the input image can be determined as edge points respectively, so as to obtain a plurality of edge points, and the embodiment of the present disclosure are not limited by the specific number of the determined edge point(s).

After obtaining the edge point(s) in the image, further, in step S102, an initial matrix with the same size as the input image is generated, and all matrix elements in the initial matrix are assigned the same initial value.

The initial matrix with the same size as the input image means that each row vector in the initial matrix corresponds to each row of pixel points in the input image, and each sub-element in the row vector corresponds to a corresponding pixel point in the row of pixels, that is, each sub-element in the initial matrix corresponds to a corresponding pixel point in the input image. For example, for an input image with an image size of 2048×512 pixels, the generated initial matrix with the same size correspondingly includes 512 rows and 2048 columns.

The initial value may be, for example, 0 or 10. The embodiments of the present disclosure are not limited by the set initial value.

After the initial matrix is generated, in step S103, for each edge point, for each pixel point located in an accumulation region of the edge point, the matrix element in the initial matrix that is corresponding to the pixel point is assigned a corresponding accumulation value to obtain an accumulation matrix.

The accumulation value may be a constant amount, for example, it may be set to 1 or it may be set to 0.5. The accumulation value may also be a variable amount, for example, it can change based on different sections of the accumulation region. For example, when the accumulation region is a 10 mm line segment with the edge point as its start point, the accumulation value of pixel points on the line segment that are 0-5 mm away from the edge point is set to 1, and the accumulation value of pixel points on the line segment that are 5-10 mm away from the edge point is set to 0.5. The embodiments of the present disclosure are not limited by the type of the accumulation value and its specific numerical value.

For each edge point, the accumulation region of the edge point includes a first direction line for accumulation along the gradient direction of the edge point and a second direction line for accumulation along the direction opposite to the gradient direction of the edge point.

For example, the first direction line for accumulation and the second direction line for accumulation can take any point along the gradient direction and the direction opposite to the gradient direction as the start point, and the first direction line for accumulation and the second direction line for accumulation each can be a straight line, a ray, or a line segment with a length, and the length can be determined based on the size of the input image and the target to be detected (for example, when the input image is a 10-inch (20.32×25.40 cm) image of a vehicle, and the circle-center position of a wheel in the vehicle needs to be detected, the length can be set to 5 cm), or the length can be determined based on the position of the edge point, for example, in the gradient direction of the edge point, another edge point with the minimum distance from the edge point is determined and the minimum distance is taken as a reference distance. The embodiments of the present disclosure are not limited by the start point, the end point, and the extending length of the first and second direction lines for accumulation.

After obtaining the accumulation matrix, in step S104, based on the accumulation matrix, positions of one or more circle-centers (also referred to as "one or more circle-center positions") in the input image are determined.

For example, each sub-element in the accumulation matrix can be filtered based on a range of numerical value, and pixel points corresponding to one or more sub-elements in the range of numerical value can be determined as the circle-centers, or the sub-element with the largest numerical value in the accumulation matrix can be determined as the circle-center. The embodiments of the present disclosure are not limited by the manner of determining the circle-center positions in the input image and the number of the determined circle-centers.

Based on the above process, by determining one or more edge points in the image, and for each edge point, setting the gradient direction based on the edge point and the direction opposite to the gradient direction to jointly determine the accumulation region, calculating the accumulation matrix based on the accumulation region, and finally determining the circle-center positions in the image, the accuracy of image detection results can be significantly improved.

Specifically, compared with the case where only the gradient direction of the edge point is used as the accumulation region for detection, the image detection method of the present disclosure takes into account characteristics of gradients in the image, that is, if the gray-scale of a circular region is higher than that of a background region in the input image, the gradient direction of the edge point of a circular region points to the circle-center; and if the gray-scale of the circular region is lower than that of the background region, the gradient direction of the edge point of the circular region is away from the circle-center. Based on this, by setting the gradient direction based on the edge point and the direction opposite to the gradient direction to jointly determine the accumulation region, so that the circle-center position can be well positioned when the calculated gradient is under the two conditions described above, and the accuracy of the image detection is improved.

Figure 1B:
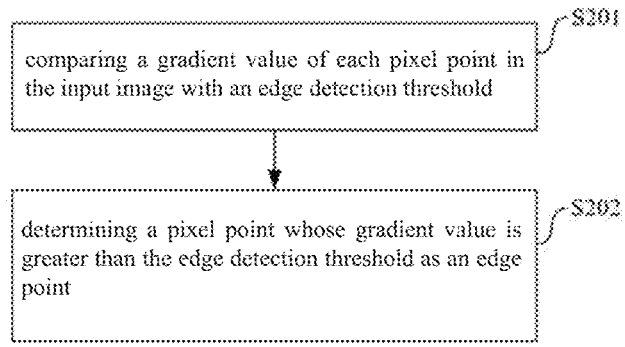
FIG. 1B illustrates a method (200) of determining edge points in an input image in the image detection method according to an embodiment of the present disclosure.

FIG. 1B illustrates a method (200) of determining edge point(s) in an input image in the image detection method according to an embodiment of the present disclosure.

Referring to FIG. 1B, in some embodiments, the edge point(s) in the input image will be determined based on gradient characteristics of the edge point(s). Specifically, first, in step S201, the gradient value of each pixel in the input image is compared with an edge detection threshold. Secondly, in step S202, pixel point(s) with a gradient value greater than the edge detection threshold is determined as edge point(s).

In some embodiments, the input image can be regarded as a two-dimensional discrete function. For example, the gradient values of a pixel point along the horizontal axis direction and along the vertical axis direction can be calculated respectively by the following formula, and then the gradient value $G(x,y)$ of the pixel point can be obtained by the vector summation:

$$G_x = f(x+1, y) - f(x, y) \quad \quad 1)$$

$$G_y = f(x, y+1) - f(x, y) \quad \quad 2)$$

$$G(x, y) = \sqrt{G_x^2 + G_y^2} \quad \quad 3)$$

where x is the coordinate of the pixel point relative to a pixel reference point along the horizontal axis, y is the coordinate of the pixel point relative to the pixel reference point along the vertical axis, f(x,y) represents the gray-scale value of the pixel point, Gx represents the gradient value of the pixel point along the horizontal axis, Gy represents the gradient value of the pixel point along the vertical axis, and G(x,y) represents the gradient value of the pixel point. The horizontal axis is in a horizontal direction, the vertical axis is in a vertical direction, and the pixel reference point is, for example, the central point in the input image. At this time, because the gray-scale value of the pixel point is in the range of 0 to 255, the calculated gradient is within the range of 0 to 255 $\sqrt{2}$, and the maximum of the calculated gradient is 255 $\sqrt{2}$.

The edge detection threshold can be a constant amount, for example, when the gradient value is calculated by the above calculation method, the edge detection threshold can be set based on the range of numerical value of the calculated gradient, for example, it can be set as two-thirds of the maximum of the calculated gradient, or it can also be set as one-half of the maximum of the calculated gradient. It can also be a variable amount, for example, as a function of the average gradient value of an image sub-region, which changes with the change of the average gradient value of different sub-regions. The embodiments of the present disclosure are not limited by the type of the edge detection threshold and its specific numerical value.

However, it should be understood that calculating the gradient of the pixel point and determining the edge point based on its gradient characteristics are not limited to the above calculation method, and it is also possible to calculate the gradient of the pixel point by calculating a first-order differential of the pixel point (for example, by Robert operator, Sobel operator, Prewitt operator, etc.) and determine the edge point, or to calculate the gradient of the pixel point by calculating a second-order differential of the pixel point (such as Canny operator and Laplacian operator) and determine the edge point. The embodiments of the present disclosure are not limited by the specific algorithm adopted to calculate the gradient of the pixel point and determine the edge point based on its gradient characteristics.

Figure 1C:
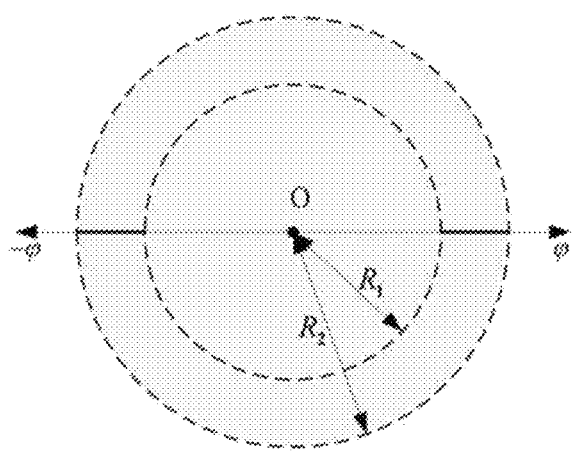
FIG. 1C illustrates a schematic diagram of an accumulation region determined by the image detection method according to an embodiment of the present disclosure.

FIG. 1C illustrates a schematic diagram of an accumulation region determined by the image detection method according to an embodiment of the present disclosure.

Referring to FIG. 1C, in some embodiments, a radius range of each edge point will be set, and an accumulation region will be further determined based on the radius range. For example, the edge point O is used as the center, and a radius range [R1, R2] is set, wherein the radius R1 represents the minimum radius value and the radius R2 represents the maximum radius value. For this edge point O, only the line segment which is along the gradient direction φ of the edge point and with a length within the radius range [R1, R2] is determined as the first direction line for accumulation, and only the line segment which is along the direction −φ opposite to its gradient direction and with a length within the radius range [R1, R2] is determined as the second direction line for accumulation. The radius range can be set according to the actual layout and retrieval requirements of the input image, and the embodiments of the present disclosure are not limited by the specific value of the set radius range.

Based on the above, by setting the radius range and determining the accumulation region based on the radius range, the accumulation region can be significantly reduced, thus reducing the subsequent calculation amount and improving the speed of the image detection.

In some embodiments, the accumulation region comprises: a first accumulation region with the first direction line for accumulation as a central line and with a deflection angle from the first direction line for accumulation that is less than or equal to a first angle threshold; and a second accumulation region with the second direction line for accumulation as the central line and with a deflection angle from the second direction line for accumulation that is less than or equal to a second angle threshold.

The first angle threshold may be, for example, 10 degrees or 30 degrees. The embodiments of the present disclosure are not limited by the specific value of the first angle threshold.

The second angle threshold may be, for example, 20 degrees or 35 degrees. The embodiments of the present disclosure are not limited by the specific value of the second angle threshold.

The values of the first angle threshold and the second angle threshold may be the same (for example, they may both be set to 30 degrees), or they may be different (for example, the first angle threshold is set to 15 degrees, and the second angle threshold is set to 40 degrees). The embodiments of the present disclosure are not limited by the set relationship between the first angle threshold and the second angle threshold.

The deflection angle includes a forward deflection angle and a reverse deflection angle. Specifically, for example, the clockwise direction around the edge point may be defined as the forward deflection, and the counterclockwise direction around the edge point may be defined as the reverse direction. The deflection angle being less than the first/second angle threshold indicates that, the deflection angle in the forward direction is less than or equal to the first/second angle threshold, and the deflection angle in the reverse direction is less than or equal to the first/second angle threshold.

It should be understood that the above-mentioned forward direction and reverse direction are only exemplary directions, and the embodiments of the present disclosure can also set the counterclockwise direction around the edge point as the forward direction and the clockwise direction around the edge point as the reverse direction. The embodiments of the present disclosure are not limited by the set forward direction and reverse direction.

Figure 2:
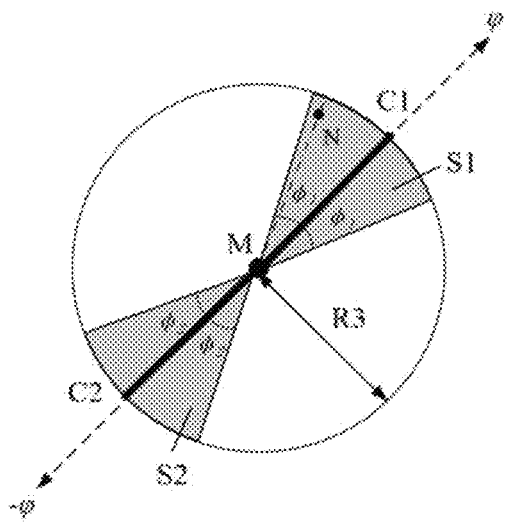
FIG. 2 illustrates a schematic diagram of another accumulation region determined by the image detection method according to an embodiment of the present disclosure.

FIG. 2 illustrates a schematic diagram of another accumulation region determined by the image detection method according to an embodiment of the present disclosure. Referring to FIG. 2, the above accumulation region can be described in more detail.

For the edge point M, the radius range is set as [0, R3], and the first direction line for accumulation C1 and the second direction line for accumulation C2 are determined based on the radius range and the gradient direction of the edge point. Further, for example, the first angle threshold $\varphi_1$ is set as 22.5 degrees, and the second angle threshold $\varphi_2$ is also set as 22.5 degrees. Furthermore, a region S1 with the first direction line for accumulation C1 as the central line and with a deflection angle from the first direction line for accumulation C1 that is less than or equal to the first angle threshold $\varphi_1$ and a region S2 with the second direction line for accumulation C2 as the central line and a deflection angle from the second direction line for accumulation C2 that is less than or equal to the second angle threshold $\varphi_2$ are determined. The region S1 and the region S2 form the accumulation region of the edge point M.

Based on the above settings, when the edge of the circular region of the input image is blurred (i.e., the gradient values of the edge points of the circular region are relatively low), resulting in errors in the positioning of the edge points or the positioned edge points being not actual edge points, by including, on a basis of the first direction line for accumulation and the second direction line for accumulation, a region with a deflection angle from the first direction line for accumulation that is less than or equal to the first angle threshold and a region with a deflection angle from the second direction line for accumulation that is less than or equal to the second angle threshold in the accumulation region, the area of the accumulation region is expanded and thus it is advantageous to make up for errors in the positioning of circle-centers caused by the errors in the positioning of the edge points, thereby improving the detection accuracy and enabling the image detection method to have a better robustness, compared with the case of only performing accumulation on the first direction line for accumulation and the second direction line for accumulation at the edge point.

Figure 3:
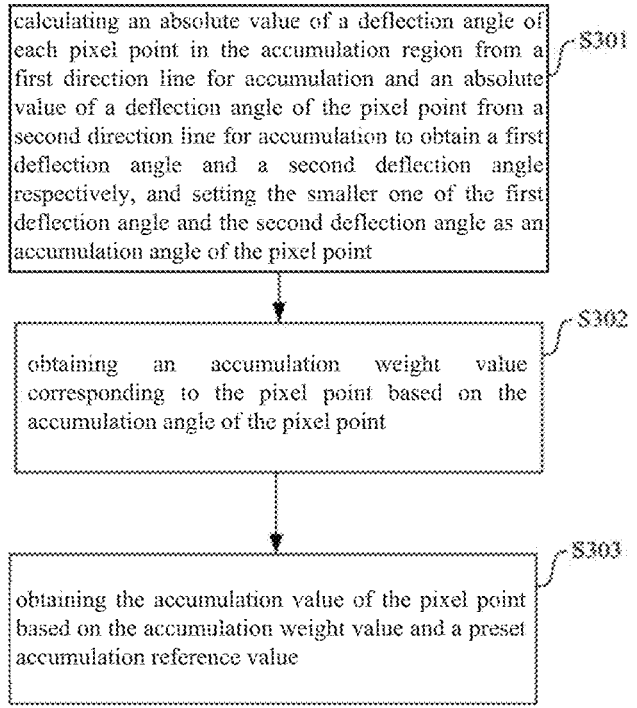
FIG. 3 illustrates an exemplary flowchart of a method (300) of assigning a corresponding accumulation value to each pixel point in the accumulation region of each edge point to obtain an accumulation matrix in the image detection method, according to an embodiment of the present disclosure.

In a case where the accumulation region is set based on the first angle threshold and the second angle threshold, calculation process of an accumulation matrix of the accumulation region can be described in more detail. FIG. 3 illustrates an exemplary flowchart of a method (300) of assigning a corresponding accumulation value to each pixel point in the accumulation region of each edge point to obtain an accumulation matrix in the image detection method, according to an embodiment of the present disclosure.

Referring to FIG. 3, in some embodiments, in order to perform the step of assigning a corresponding accumulation value to each pixel point in the accumulation region of each edge point to obtain an accumulation matrix, first, in step S301, an absolute value of a deflection angle of each pixel point in the accumulation region from a first direction line for accumulation and an absolute value of a deflection angle of the pixel point from a second direction line for accumulation are calculated to obtain a first deflection angle and a second deflection angle respectively, and the smaller one of the first deflection angle and the second deflection angle is set as the accumulation angle of the pixel point.

For example, referring to the accumulation region of the edge point M shown in FIG. 2, under the condition that the counterclockwise direction around the edge point is defined as the forward direction, a pixel point N in the accumulation region has a reverse deflection angle from the first direction line for accumulation, the deflection angle from the first direction line for accumulation is −20 degrees, and the absolute value of the deflection angle is calculated to obtain that the first deflection angle of the pixel point is 20 degrees. At the same time, the pixel point N in the accumulation region also has a forward deflection angle from the second direction line for accumulation, and the deflection angle of the second direction line for accumulation is 160 degrees, then it is known that the second deflection angle of the pixel point is 160 degrees. Therefore, based on the comparison, it can be known that the accumulation angle of the pixel point is the first deflection angle, that is, 20 degrees.

After obtaining the accumulation angle of the pixel point, in step S302, an accumulation weight value corresponding to the pixel point is obtained based on the accumulation angle of the pixel point.

For example, the accumulation weight values corresponding to different accumulation angles can be obtained based on a look-up table. Alternately, accumulation weight values corresponding to the accumulation angles can be calculated based on a function or formula. The embodiments of the present disclosure are not limited by the specific manner in which the corresponding accumulation weight value is obtained based on the accumulation angle.

In some embodiments, the step of obtaining the accumulation weight value corresponding to the pixel point based on the accumulation angle of the pixel point comprises: firstly, establishing a Gaussian function based on the accumulation angle of the pixel point; and then, calculating the accumulation weight value corresponding to the pixel point based on the Gaussian function.

In some embodiments, for example, the Gaussian function can be established based on the accumulation angle according to the following formula to calculate the accumulation weight value corresponding to the pixel point.

$$G(\theta) = \frac{1}{\sqrt{2\pi}\sigma} e^{\frac{\theta^2}{2\sigma^2}} \quad 4)$$

where θ is the accumulation angle, G(θ) is the accumulation weight value corresponding to the accumulation angle θ, σ is a parameter controlling the weight value, which can be set based on image detection requirements, and the embodiments of the present disclosure are not limited by the specific value of the parameter σ controlling the weight value.

After calculating the accumulation weight value, in step S303, the accumulation value of the pixel point is obtained based on the accumulation weight value and an accumulation reference value.

The accumulation reference value is an initial accumulation value for all pixel points in the accumulation region. For example, it can be set to 1, or it can be set to 100. The embodiments of the present disclosure are not limited by the specific value of the set accumulation reference value.

The accumulation value can be obtained, for example, by multiplying the accumulation weight value of the pixel point by the accumulation reference value, or it can be obtained through a function or formula based on the accumulation weight value and the accumulation reference value. The embodiments of the present disclosure are not limited by the specific manner in which the accumulation value is obtained based on the accumulation weight value and the accumulation reference value.

Specifically, for example, under the condition that the accumulation value is obtained by multiplying the accumulation weight value and the accumulation reference value, when the calculated accumulation weight value of the pixel point is 0.8 and the accumulation reference value is 50, it can be known that the accumulation value of the pixel point is 40 by multiplying the accumulation weight value and the accumulation reference value.

Based on the above, on a basis of obtaining the accumulation region based on the first angle threshold and the second angle threshold, by calculating the deflection angle of the pixel point in the accumulation region at this time and obtaining its corresponding accumulation weight value based on the deflection angle, the accumulation value of the pixel point is determined, so that the pixel points with different deflection angles in the accumulation region have different accumulation values correspondingly, which improves the accuracy of the generated accumulation matrix and further enhances the precision and accuracy of the image detection.

Figure 4:
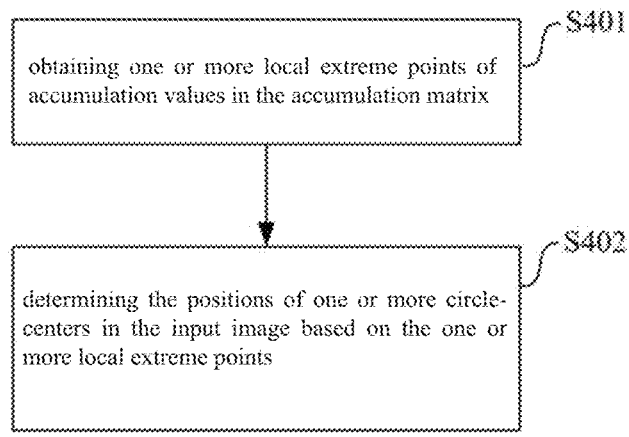
FIG. 4 illustrates an exemplary flowchart of a method (400) of determining a circle-center position in an image in the image detection method according to an embodiment of the present disclosure.

FIG. 4 illustrates an exemplary flowchart of a method (400) of determining circle-center position(s) in an image in the image detection method according to an embodiment of the present disclosure.

Referring to FIG. 4, in some embodiments, in order to perform the step of determining the circle-center position(s) of the input image based on the accumulation matrix, first, in step S401, one or more local extreme points of the accumulation values in the accumulation matrix are obtained. Thereafter, in step S402, based on the one or more local extreme points, one or more circle-center positions in the input image are determined.

For example, when determining the local extreme points, each accumulation value in the accumulation matrix can be compared with its adjacent accumulation values located in its upper, lower, left and right side, and if the accumulation value is greater than all adjacent accumulation values, the accumulation value is determined as a local extreme point in the accumulation matrix. However, it should be understood that each accumulation value in the accumulation matrix can be compared with accumulation values at other locations to determine a local extreme point, or a local extreme point can be determined through other manners. The embodiments of the present disclosure are not limited by the manner of determining the local extreme points in the accumulation matrix and the number of the determined local extreme points.

In some embodiments, the process of determining the circle-center position(s) in the input image based on the obtained local extreme point(s) can be described in more detail, for example. When only one local extreme point is obtained, for example, the pixel point corresponding to the local extreme point can be determined, and the pixel point can be taken as a circle-center, thus obtaining a single circle-center. When a plurality of local extreme points are obtained, for example, a plurality of pixel points corresponding to the local extreme points can be determined, and each of the plurality of pixel points can be taken as a circle-center, thus obtaining a plurality of circle-centers. The embodiments of the present disclosure are not limited by the number of obtained circle-centers.

In some embodiments, after the local extreme point(s) are obtained, the obtained local extreme point(s) can be further processed and filtered to determine the circle-center(s). The embodiments of the present disclosure are not limited by the specific manner of determining the circle-center(s) based on the obtained local extreme point(s).

Figure 5:
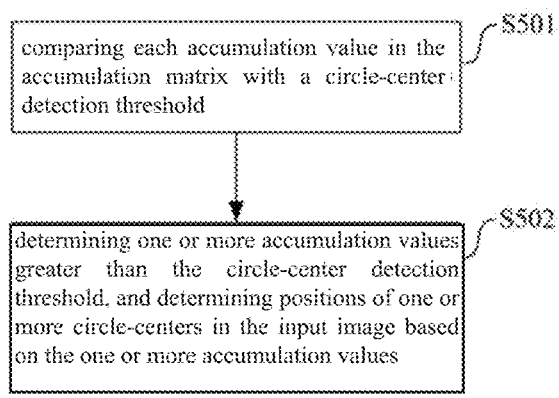
FIG. 5 illustrates another exemplary flowchart of a method (500) of determining the circle-center position in the image in the image detection method according to an embodiment of the present disclosure.

FIG. 5 illustrates another exemplary flowchart of a method (500) of determining the circle-center position in the image in the image detection method according to an embodiment of the present disclosure.

In some embodiments, determining the circle-center positions in the input image based on the accumulation matrix comprises the following steps. Firstly, in step S501, each accumulation value in the accumulation matrix is compared with a circle-center detection threshold. Then, one or more accumulation values greater than the circle-center detection threshold are determined, and one or more circle-center positions in the input image are determined based on the one or more accumulation values.

The circle-center detection threshold may be, for example, 20 or 34. The embodiments of the present disclosure are not limited by the specific numerical value of the set circle-center detection threshold.

For example, when the threshold of the number of circle-centers in the input image is not set, if the accumulation values of five sub-elements in the accumulation matrix meet the preset range of numerical value, the pixel points corresponding to the five sub-elements can be determined as the circle-centers, for example. When the threshold of the number of centers in the input image is set to 3, if the accumulation values of five sub-elements in the accumulation matrix meet the preset range of numerical value, and the accumulation values of the five sub-elements are $n_1$, $n_2$, $n_3$, $n_4$ and $n_5$, for example, the accumulation values of the five sub-elements can be sorted from large to small, for example, the sorting result is $n_1 > n_2 > n_3 > n_4 > n_5$, and based on the sorting result, the pixel points corresponding to the sub-elements whose accumulation values are $n_1$, $n_2$ and $n_3$ can be determined as the circle-centers, for example.

In some embodiments, if it is detected that the accumulation values of a plurality of sub-elements in the accumulation matrix meet the preset range of numerical value and pixel points corresponding to the plurality of sub-elements are obtained accordingly, the plurality of pixel points can be further filtered based on the relationship of pixel positions of the plurality of pixel points, for example. For example, when the accumulation values of three sub-elements in the accumulation matrix meet the preset range of numerical value, the pixel points corresponding to the three sub-elements are $k_1$, $k_2$ and $k_3$, the pixel coordinates of respective pixel point are $k_1(12.4, 12)$, $k_2(12.41, 12.01)$ and $k_3(12.39, 12)$, and the unit of their coordinates is mm. If an area threshold is set to 2.5 mm$^2$, it can be seen that the area of a minimum region including the above-mentioned pixel points $k_1$, $k_2$ and $k_3$ is smaller than the area threshold, so it can be seen that coordinate positions of the above-mentioned three pixel points are close, then the pixel point whose corresponding sub-element has the largest accumulation value among the above-mentioned three pixel points can be determined as the circle-center, and the other two pixel points can be discarded. Accordingly, the situation that there is a single circle-center in the input image but a plurality of circle-center positions are obtained due to detection errors, can be advantageously eliminated.

Figure 6:
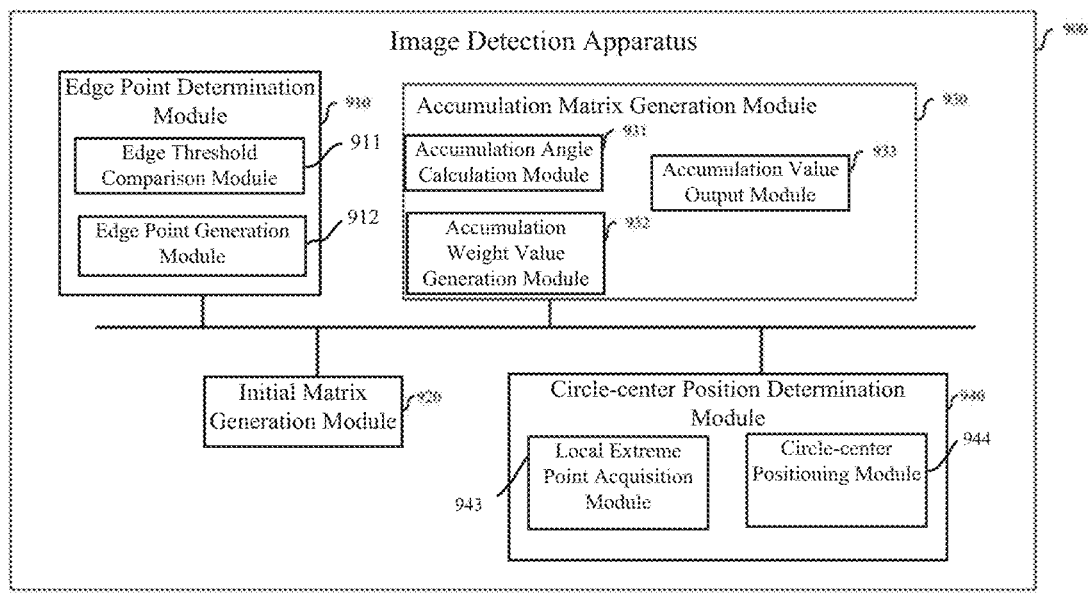
FIG. 6 illustrates an exemplary block diagram of an image detection apparatus according to an embodiment of the present disclosure.

FIG. 6 illustrates an exemplary block diagram of an image detection apparatus according to an embodiment of the present disclosure.

The image detection apparatus 900 shown in FIG. 6 includes an edge point determination module 910, an initial matrix generation module 920, an accumulation matrix generation module 930 and a circle-center position determination module 940. It can execute the image detection method shown in FIG. 1A. And, for each edge point, an accumulation region of the edge point includes a first direction line for accumulation along the gradient direction of the edge point and a second direction line for accumulation along the direction opposite to the gradient direction of the edge point.

The edge point determination module 910 is configured to determine one or more edge points in an input image and gradient directions of the one or more edge points. The initial matrix generation module 920 is configured to generate an initial matrix with the same size as the input image, and assign the same initial value to all matrix elements in the initial matrix. The accumulation matrix generation module 930 is configured to: for each edge point, for each pixel point located in the accumulation region of the edge point, assign a corresponding accumulation value to a matrix element in the initial matrix that is corresponding to the pixel point, to obtain an accumulation matrix. The circle-center position determination module 940 is configured to determine one or more circle-center positions in the input image based on the accumulation matrix.

The input image may be an image captured in real time by a camera or a video recording apparatus, or may be an image obtained in other manners in advance. The embodiments of the present disclosure are not limited sources and acquisition manners of the input image. For example, the input image can be an image taken directly by a road camera, a monitor camera of an unmanned supermarket, or an image obtained after pre-processing by a computer.

The input image may be a color image or a gray-scale image, and the embodiments of the present disclosure are not limited by the type of the input image.

For example, in the input image, if the pixel value of surrounding pixel points of a certain pixel change dramatically, the certain pixel can be determined as an edge point. Therefore, the gradient value at the edge point will be significantly greater than the gradient values of the surrounding pixel points, and the gradient direction of the edge point characterizes the direction for the pixel value to increase.

In some embodiments, based on image contents of the input image, for example, one pixel point in the input image can be determined as one edge point, and then one edge point can be obtained, or a plurality of pixel points in the input image can be determined as edge points respectively, so as to obtain a plurality of edge points, and the embodiment of the present disclosure are not limited by the specific number of the determined edge point(s).

The initial matrix with the same size as the input image means that each row vector in the initial matrix corresponds to each row of pixel points in the input image, and each sub-element in a row vector corresponds to a corresponding pixel point in a row of pixels, that is, each sub-element in the initial matrix corresponds to a corresponding pixel point in the input image. For example, for an input image with an image size of 2048×512 pixels, the generated initial matrix with the same size correspondingly includes 512 rows and 2048 columns.

The initial value may be, for example, 0 or 10. The embodiments of the present disclosure are not limited by the set initial values.

The accumulation value may be a constant amount, for example, it may be set to 1 or it may be set to 0.5. It can also be a variable amount, for example, it can change based on different sections of the accumulation region. For example, when the accumulation region is a 10 mm line segment with the edge point as its start point, the accumulation value of pixel points on the line segment that are 0-5 mm away from the edge point is set to 1, and the accumulation value of pixel points on the line segment that are 5-10 mm away from the edge point is set to 0.5. The embodiments of the present disclosure are not limited by the type of the accumulation value and its specific numerical value.

For example, the first direction line for accumulation and the second direction line for accumulation can take any point along the gradient direction and the direction opposite to the gradient direction as the start point, and the first direction line for accumulation and the second direction line for accumulation each can be a straight line, a ray, or a line segment with a length, and the length can be determined based on the size of the input image and the target to be detected (for example, when the input image is a 10-inch (20.32×25.40 cm) image of a vehicle, and the circle-center position of a wheel in the vehicle needs to be detected, the length can be set to 5 cm), or the length can also be determined based on the position of the edge point, for example, in the gradient direction of the edge point, another edge point with the minimum distance from the edge point is determined and the minimum distance is taken as a reference distance. The embodiments of the present disclosure are not limited by the start point, the end point, and the extending length of the first and second direction lines for accumulation.

The operation of determining the circle-center position(s) in the input image may comprise the following steps. Each sub-element in the accumulation matrix can be filtered based on a range of numerical value, and the pixel point(s) corresponding to one or more sub-elements within the range of numerical value can be determined as the circle-center(s), or the sub-element with the largest numerical value in the accumulation matrix can be determined as the circle-center. The embodiments of the present disclosure are not limited by the manner of determining the circle-center position(s) in the input image and the number of the determined circle-centers.

Based on the image detection apparatus, by determining the edge point(s) in the image, and setting the gradient direction(s) based on the edge point(s) and the direction(s) opposite to the gradient direction(s) to jointly determine the accumulation region, calculating the accumulation matrix based on the accumulation region and finally determining the circle-center position(s) in the image, the accuracy of image detection results can be significantly improved.

Specifically, compared with the case where only the gradient direction(s) of the edge point(s) is used as the accumulation region for detection, the image detection apparatus of the present disclosure takes into account the characteristics of gradients in the image, that is, if the gray-scale of a circular region is higher than that of a background region in the input image, the gradient directions of the edge points of the circular region point to the circle-center; and if the gray-scale of the circular region is lower than that of the background region, the gradient directions of the edge points of the circular region are away from the circle-center. Based on this, by setting the gradient directions based on the edge points and the directions opposite to the gradient directions, the accumulation region is jointly determined, so that the circle-center positions can be well positioned when the calculated gradients are under the two conditions described above, and the accuracy of the image detection is improved.

In some embodiments, the edge point determination module 910 is configured to perform the process shown in FIG. 1B to determine the edge point(s) in an input image. The edge point determination module 910 includes an edge threshold comparison module 911 and an edge point generation module 912.

The edge threshold comparison module 911 is configured to perform the operation of step S201 in FIG. 1B to compare the gradient value of each pixel in the input image with the edge detection threshold. The edge point generation module 912 is configured to perform the operation of step S202 in FIG. 1B to determine the pixel point(s) with a gradient value greater than the edge detection threshold as the edge point(s).

The edge detection threshold can be a constant amount, for example, the edge detection threshold can be set based on a range of numerical value of the calculated gradient, for example, it can be set as two-thirds of the calculated maximum gradient value, or it can also be set as one-half of the maximum gradient value. It can also be a variable amount, for example, as a function of the average gradient value of an image sub-region, which changes with the change of the average gradient value of different sub-regions. The embodiments of the present disclosure are not limited by the type of the edge detection threshold and its specific numerical value.

However, it should be understood that the operation of determining the edge point(s) based on gradient characteristics can be realized by, for example, the above formulas 1), 2) and 3). It is also possible to calculate the gradient of a pixel point by calculating a first-order differential of the pixel point(for example, by Robert operator, Sobel operator, Prewitt operator, etc.) and determine an edge point, or to calculate the gradient of a pixel point by calculating a second-order differential of the pixel point(such as Canny operator and Laplacian operator) and determine the edge point. The embodiments of the present disclosure are not limited by the specific algorithm adopted to calculate the gradient of the pixel point and determine edge points based on its gradient characteristics.

In some embodiments, a radius range of each edge point will be set, and an accumulation region will be further determined based on the radius range. By setting the radius range and determining the accumulation region based on the radius range, the accumulation region can be significantly reduced, thus reducing the subsequent calculation amount and improving the speed of the image detection.

In some embodiments, the accumulation region comprises: a first accumulation region with a first direction line for accumulation as a central line and with a deflection angle from the first direction line for accumulation that is less than or equal to a first angle threshold; and a second accumulation region with a second direction line for accumulation as the central line and with a deflection angle from the second direction line for accumulation that is less than or equal to a second angle threshold.

The first angle threshold may be, for example, 10 or 30. The embodiments of the present disclosure are not limited by the specific value of the first angle threshold.

The second angle threshold may be, for example, 20 or 35. The embodiments of the present disclosure are not limited by the specific value of the second angle threshold.

The first angle threshold and the second angle threshold may be the same (for example, they may both be set to 30 degrees), or they may be different (for example, the first angle threshold is set to 15 degrees, and the second angle threshold is set to 40 degrees). The embodiments of the present disclosure are not limited by the set relationship between the first angle threshold and the second angle threshold.

The deflection angle includes a forward deflection angle and a reverse deflection angle. Specifically, for example, the clockwise direction around the edge point is defined as the forward deflection, and the counterclockwise direction around the edge point is defined as the reverse direction. The deflection angle being less than the first/second angle threshold indicates that, the deflection angle in the forward direction is less than or equal to the first/second angle threshold, and the deflection angle in the reverse direction is less than or equal to the first/second angle threshold.

On the basis of the first direction line for accumulation and the second direction line for accumulation, a region with a deflection angle from the first direction line for accumulation that is less than or equal to the first angle threshold and a region with a deflection angle from the second direction line for accumulation that is less than or equal to the second angle threshold are set to be included in the accumulation region, so that the image detection method has a better robustness, and can also have a higher accuracy for the detection under the condition that an edge point is missing or errors in positioning edge points are present.

In a case of setting the accumulation region based on the first angle threshold and the second angle threshold, the accumulation matrix generation module 930 further includes an accumulation angle calculation module 931, an accumulation weight value generation module 932 and an accumulation value output module 933. The accumulation matrix generation module 930 can perform the method as shown in FIG. 3, i.e., for each edge point, for each pixel point located in an accumulation region of the edge point, assigning a corresponding accumulation value to a matrix element in the initial matrix that is corresponding to the pixel point, to obtain an accumulation matrix.

The accumulation angle calculation module 931 is configured to perform the operation of step S301 in FIG. 3, i.e., calculating an absolute value of a deflection angle of each pixel point in the accumulation region from a first direction line for accumulation and an absolute value of a deflection angle of the pixel point from a second direction line for accumulation to obtain a first deflection angle and a second deflection angle respectively, and setting the smaller one of the first deflection angle and the second deflection angle as an accumulation angle of the pixel point.

Further, the accumulation weight value generation module 932 is configured to perform the operation of step S302 in FIG. 3, i.e., obtaining an accumulation weight value corresponding to the pixel point based on the accumulation angle of the pixel point.

For example, the accumulation weight values corresponding to different accumulation angles can be obtained based on a look-up table. Alternately, the accumulation weight value corresponding to the accumulation angle can be calculated based on a function or formula, for example, the formula 4). The embodiments of the present disclosure are not limited by the specific manner in which the corresponding accumulation weight value is obtained based on the accumulation angle.

The accumulation value output module 933 is configured to perform the operation of step S303 in FIG. 3, i.e., obtaining the accumulation value of the pixel point based on the accumulation weight value and an accumulation reference value.

The accumulation reference value is the initial accumulation value for all pixel points in the accumulation region. For example, it can be set to 1, or it can be set to 100. The embodiments of the present disclosure are not limited by the specific value of the set accumulation reference value.

The accumulation value can be obtained, for example, by multiplying the accumulation weight value of the pixel point by the accumulation reference value, or it can be obtained through a function or formula based on the accumulation weight value and the accumulation reference value. The embodiments of the present disclosure are not limited by the specific manner in which the accumulation value is obtained based on the accumulation weight value.

Based on the above description, when the edge of the circular region of the input image is blurred (i.e., the gradient values of the edge points of the circular region are relatively low), resulting in errors in the positioning of the edge points or the positioned edge points being not actual edge points, by including, on a basis of the first direction line for accumulation and the second direction line for accumulation, a region with a deflection angle from the first direction line for accumulation that is less than or equal to the first angle threshold and a region with a deflection angle from the second direction line for accumulation that is less than or equal to the second angle threshold in the accumulation region, the area of the accumulation region is expanded and thus it is advantageous to make up for errors in the positioning of circle-centers caused by the errors in the positioning of the edge points, thereby improving the detection accuracy and enabling the image detection method to have a better robustness, compared with the case of only performing accumulation on the first direction line for accumulation and the second direction line for accumulation at the edge point.

In some embodiments, the circle-center position determination module 940 is configured to perform the method as shown in FIG. 4, which may include a local extreme point acquisition module 941 and a circle-center positioning module 942, for example.

The local extreme point acquisition module 941 is configured to perform the operation of step S401 in FIG. 4, i.e., obtaining one or more local extreme points of the accumulation values in the accumulation matrix. The circle-center positioning module 942 is configured to perform the operation of step S402 in FIG. 4, i.e., determining positions of one or more circle-centers in the input image based on the one or more local extreme points.

For example, when determining the local extreme point(s), each accumulation value in the accumulation matrix can be compared with its adjacent accumulation values located in its upper, lower, left and right side, and if the accumulation value is greater than all adjacent accumulation values, the accumulation value is determined as a local extreme point in the accumulation matrix. However, it should be understood that each accumulation value in the accumulation matrix can be compared with accumulation values at other locations to determine a local extreme point, or a local extreme point can be determined through other manners. The embodiments of the present disclosure are not limited by the manner of determining the local extreme points in the accumulation matrix and the number of the determined local extreme points.

Figure 7:
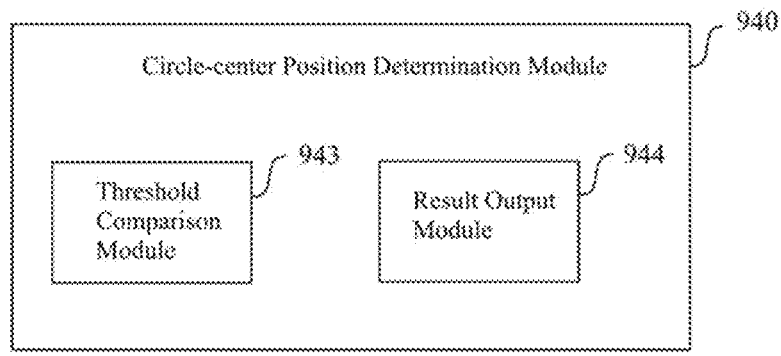
FIG. 7 illustrates an exemplary block diagram of a circle-center position determination module of the image detection apparatus according to an embodiment of the present disclosure.

FIG. 7 illustrates an exemplary block diagram of a circle-center position determination module of the image detection apparatus according to an embodiment of the present disclosure.

Referring to FIG. 7, in some embodiments, the circle-center position determination module 940 is configured to perform the method as shown in FIG. 5, and the circle-center position determination module 940 may include a threshold comparison module 943 and a result output module 944, for example.

The edge threshold comparison module 943 is configured to perform the operation of step S501 in FIG. 5, i.e., comparing each accumulation value in the accumulation matrix with a circle-center detection threshold. The result output module 944 is configured to perform the operation of step S502 in FIG. 5, i.e., determining one or more accumulation values greater than the circle-center detection threshold, and determining one or more circle-center positions in the input image based on the one or more accumulation values.

The circle-center detection threshold may be, for example, 20 or 34. The embodiments of the present disclosure are not limited by the specific value of the set circle-center detection threshold.

Figure 8:
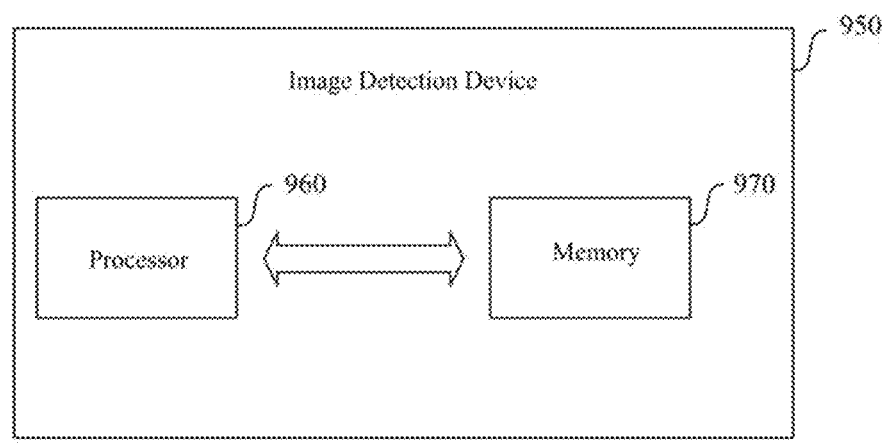
FIG. 8 illustrates an exemplary block diagram of an image detection device according to an embodiment of the present disclosure.

FIG. 8 shows an exemplary block diagram of an image detection apparatus 950 according to an embodiment of the present disclosure.

The image detection device 950 shown in FIG. 8 can be implemented as one or more special or general computer system modules or components, such as personal computers, notebook computers, tablet computers, mobile phones digital assistance (PDA) and any intelligent portable devices. The image detection device 950 may include at least one processor 960 and a memory 970.

The at least one processor is used for executing program instructions. The memory 970 can exist in different forms of program storage units and data storage units in the image detection device 950, such as hard disk, read-only memory (ROM) and random access memory (RAM), which can be used to store various data files used in the process of processing and/or executing image detection by the processor and possible program instructions executed by the processor. Although not shown in the drawings, the image detection device 950 may also include an input/output component that supports the input/output data flow between the image detection device 950 and other components (such as the image acquisition device 980). The image detection device 950 can also transmit information and data to the network and receive information and data from the network through a communication port.

In some embodiments, the memory 970 includes a set of instructions that when executed by the processor 960, cause the image detection device 950 to perform operations, the operations comprising: determining one or more edge points in an input image and gradient directions of the one or more edge points; generating an initial matrix with the same size as the input image, and assigning the same initial value to all matrix elements in the initial matrix; for each edge point, for each pixel point located in an accumulation region of the edge point, assigning a corresponding accumulation value to a matrix element in the initial matrix that is corresponding to the pixel point, to obtain an accumulation matrix; determining one or more circle-center positions in the input image based on the accumulation matrix; wherein, for each edge point, the accumulation region of the edge point includes a first direction line for accumulation along the gradient direction of the edge point and a second direction line for accumulation along the direction opposite to the gradient direction of the edge point.

The input image may be an image captured in real time by a camera or a video recording apparatus, or may be an image obtained in other ways in advance. The embodiments of the present disclosure are not limited sources and acquisition manners of the input image. For example, the input image can be an image taken directly by a road camera, a monitor camera of an unmanned supermarket, or an image obtained after pre-processing by a computer.

For example, in the input image, if pixel values of a pixel point around a certain pixel changes dramatically, the pixel point can be determined as an edge point. Therefore, the gradient value at the edge point will be significantly greater than the gradient values of the surrounding pixel points, and the gradient direction of the edge point characterizes the direction for the pixel value to increase.

In some embodiments, based on image contents of the input image, for example, one pixel point in the input image can be determined as one edge point, and then one edge point can be obtained, or a plurality of pixel points in the input image can be determined as edge points respectively, so as to obtain a plurality of edge points, and the embodiment of the present disclosure are not limited by the specific number of the determined edge point(s).

In some embodiments, the accumulation region comprises: a first accumulation region with a first direction line for accumulation as a central line and with a deflection angle from the first direction line for accumulation that is less than or equal to a first angle threshold; and a second accumulation region with a second direction line for accumulation as the central line and with a deflection angle from the second direction line for accumulation that is less than or equal to a second angle threshold.

In some embodiments, the step of for each edge point, assigning a corresponding accumulation value to each pixel point in the accumulation region of the edge point to obtain an accumulation matrix comprises: calculating an absolute value of a deflection angle of each pixel point in the accumulation region from a first direction line for accumulation and an absolute value of a deflection angle of the pixel point from a second direction line for accumulation to obtain a first deflection angle and a second deflection angle, and setting the angle with the smaller one of the first deflection angle and the second deflection angle as the accumulation angle of the pixel point, respectively; based on the accumulation angle of the pixel point, obtaining the accumulation weight value corresponding to the pixel point; and obtaining the accumulation value of the pixel point based on the accumulation weight value and an accumulation reference value.

In some embodiments, the image detection device 950 may receive images collected by an image acquisition device outside the image detection device 950, and perform the image detection method described above on the received image data to realize the functions of the image detection apparatus described above.

Although in FIG. 8, the processor 960 and the memory 970 are shown as separate modules, those skilled in the art can understand that the above-mentioned device modules can be implemented as separate hardware devices or integrated into one or more hardware devices. As long as the principles described in the present disclosure can be realized, specific implementations of different hardware devices should not be taken as a factor limiting the protection scope of the present disclosure.

According to another aspect of the present disclosure, there is also provided a non-volatile computer-readable storage medium having computer-readable instructions stored thereon, and when the instructions are executed by a computer, the aforementioned method is executed.

The program part of technology can be regarded as a "product" or "article" in a form of executable code and/or related data, which is participated or realized by computer-readable medium. The tangible and permanent storage medium can include the memory or storage used by any computer, processor, or similar device or related module, for example, various semiconductor memories, tape drives, disk drives, or any similar devices that can provide storage functions for software.

All or part of the software may sometimes communicate through a network, such as the Internet or other communication networks. Such communication can load software from one computer device or processor to another. For example, a hardware platform is loaded from a server or host computer of the image detection device to a computer environment, or other computer environments for implementing the system, or systems with similar functions related to providing information required for image detection. Therefore, another medium capable of transmitting software elements can also be used as a physical connection between local devices, such as light wave, radio wave, electromagnetic wave, etc., which can be propagated through cables, optical cables or air. A physical medium used for carrier wave, such as cable, wireless connection or optical cable, can also be considered as a medium carrying software. As used herein, unless the tangible "storage" medium is limited, other terms representing computer or machine "readable medium" refer to the medium involved in the execution of any instruction by the processor.

The present disclosure uses specific words to describe embodiments of the present disclosure. Expressions such as "first/second embodiment", "an embodiment", and/or "some embodiments" mean certain features, structures or characteristics related to at least one embodiment of the present disclosure. Therefore, it should be emphasized and noted that "an embodiment" or "one embodiment" or "an alternative embodiment" mentioned in different places in this description do not necessarily mean the same embodiment. In addition, certain features, structures, or characteristics in one or more embodiments of the present disclosure may be combined appropriately.

In addition, those skilled in the art can understand that various aspects of the disclosure can be illustrated and described by several patentable categories or situations, including combinations of any new and useful processes, machines, products or substances, or any new and useful improvements to them. Accordingly, various aspects of the present disclosure can be completely executed by hardware, software (including firmware, resident software, microcode, etc.), or a combination of hardware and software. The above hardware or software can be referred to as "data block", "module", "engine", "unit", "component" or "system". Furthermore, aspects of the present disclosure may be embodied as a computer product located in one or more computer-readable media, the product including computer-readable program code.

Unless otherwise defined, all terms (including technical and scientific terms) used herein have the same meanings as commonly understood by those of ordinary skill in the art to which this disclosure belongs. It should also be understood that terms such as those defined in general dictionaries should be interpreted as having meanings consistent with their meanings in the context of the related art, and should not be interpreted in an idealized or extremely formal sense unless explicitly defined herein.

The above is an illustration of the present disclosure, and should not be considered as a limitation thereof. Although several exemplary embodiments of the present disclosure have been described, those skilled in the art will readily understand that many modifications can be made to the exemplary embodiments without departing from the novel teaching and advantages of the present disclosure. Therefore, all such modifications are intended to be included within the scope of the present disclosure as defined by the claims. It should be understood that the above is a description of the present disclosure, and should not be regarded as limited to the specific embodiments disclosed, and modifications to the disclosed embodiments and other embodiments are intended to be included within the scope of the appended claims. The disclosure is defined by the claims and their equivalents.

What is claimed is:

1. An image detection method, comprising:
   determining one or more edge points in an input image and gradient directions of the one or more edge points;
   generating an initial matrix with a same size as the input image, and assigning a same initial value to all matrix elements in the initial matrix;
   for each edge point, for each pixel point located in an accumulation region of the edge point, assigning a corresponding accumulation value to a matrix element in the initial matrix that is corresponding to the pixel point, to obtain an accumulation matrix; and
   determining positions of one or more circle-centers in the input image based on the accumulation matrix;
   wherein, for each edge point, the accumulation region of the edge point includes a first direction line for accumulation along a gradient direction of the edge point and a second direction line for accumulation along a direction opposite to the gradient direction of the edge point,
   wherein, the step of for each edge point, for each pixel point located in the accumulation region of the edge point, assigning the corresponding accumulation value to the matrix element in the initial matrix that is corresponding to the pixel point, to obtain the accumulation matrix, comprises:
   calculating an absolute value of a deflection angle of each pixel point in the accumulation region from the first direction line for accumulation and an absolute value of a deflection angle of the pixel point from the second direction line for accumulation to obtain a first deflection angle and a second deflection angle respectively, and setting the smaller one of the first deflection angle and the second deflection angle as an accumulation angle of the pixel point;
   obtaining an accumulation weight value corresponding to the pixel point based on the accumulation angle of the pixel point; and
   obtaining the accumulation value of the pixel point based on the accumulation weight value and an accumulation reference value.

2. The image detection method according to claim 1, wherein the accumulation region comprises:
   a first accumulation region with the first direction line for accumulation as a central line and with a deflection angle from the first direction line for accumulation that is less than or equal to a first angle threshold; and
   a second accumulation region with the second direction line for accumulation as the central line and with a deflection angle from the second direction line for accumulation that is less than or equal to a second angle threshold.

3. The image detection method according to claim 1, wherein the step of obtaining the accumulation weight value corresponding to the pixel point based on the accumulation angle of the pixel point comprises:
   establishing a Gaussian function based on the accumulation angle of the pixel point; and
   calculating the accumulation weight value corresponding to the pixel point based on the Gaussian function.

4. The image detection method according to claim 1, wherein the step of determining positions of one or more circle-centers in the input image based on the accumulation matrix comprises:
   obtaining one or more local extreme points of accumulation values in the accumulation matrix; and
   determining the positions of one or more circle-centers in the input image based on the one or more local extreme points.

5. The image detection method according to claim 1, wherein the step of determining the positions of one or more circle-centers in the input image based on the accumulation matrix further comprises:
   comparing each accumulation value in the accumulation matrix with a circle-center detection threshold; and
   determining one or more accumulation values greater than the circle-center detection threshold, and determining positions of one or more circle-centers in the input image based on the one or more accumulation values.

6. The image detection method according to claim 1, wherein the step of determining one or more edge points in the input image comprises:
   comparing a gradient value of each pixel point in the input image with an edge detection threshold; and
   determining a pixel point whose gradient value is greater than the edge detection threshold as an edge point.

7. A computer-readable storage medium, characterized in that computer-readable instructions are stored thereon, and when the instructions are executed by a computer, the method according to claim 1 is executed.

8. An image detection apparatus, comprising:
an edge point determination module configured to determine one or more edge points in an input image and gradient directions of the one or more edge points;
an initial matrix generation module configured to generate an initial matrix with a same size as the input image, and assign a same initial value to all matrix elements in the initial matrix;
an accumulation matrix generation module configured to:
for each edge point, for each pixel point located in an accumulation region of the edge point, assign a corresponding accumulation value to a matrix element in the initial matrix that is corresponding to the pixel point, to obtain an accumulation matrix; and
a circle-center position determination module configured to determine positions of one or more circle-centers in the input image based on the accumulation matrix;
wherein, for each edge point, the accumulation region of the edge point includes a first direction line for accumulation along a gradient direction of the edge point and a second direction line for accumulation along a direction opposite to the gradient direction of the edge point,
wherein the accumulation matrix generation module comprises:
an accumulation angle calculation module configured to calculate an absolute value of a deflection angle of each pixel point in the accumulation region from a first direction line for accumulation and an absolute value of a deflection angle of the pixel point from a second direction line for accumulation to obtain a first deflection angle and a second deflection angle respectively, and set the smaller one of the first deflection angle and the second deflection angle as an accumulation angle of the pixel point;
an accumulation weight value generation module configured to obtain an accumulation weight value corresponding to the pixel point based on the accumulation angle of the pixel point; and
an accumulation value output module configured to obtain the accumulation value of the pixel point based on the accumulation weight value and an accumulation reference value.

9. The image detection apparatus according to claim 8, wherein the accumulation region comprises:
a first accumulation region with the first direction line for accumulation as a central line and with a deflection angle from the first direction line for accumulation that is less than or equal to a first angle threshold; and
a second accumulation region with the second direction line for accumulation as the central line and with a deflection angle from the second direction line for accumulation that is less than or equal to a second angle threshold.

10. An image detection device, wherein the device comprises a processor and a memory, and the memory includes a set of instructions that when executed by the processor, cause the image detection device to perform operations, the operations comprising:
determining one or more edge points in an input image and gradient directions of the one or more edge points;
generating an initial matrix with a same size as the input image, and assigning a same initial value to all matrix elements in the initial matrix;
for each edge point, for each pixel point located in an accumulation region of the edge point, assigning a corresponding accumulation value to a matrix element in the initial matrix that is corresponding to the pixel point, to obtain an accumulation matrix; and
determining positions of one or more circle-centers in the input image based on the accumulation matrix;
wherein, for each edge point, the accumulation region of the edge point includes a first direction line for accumulation along a gradient direction of the edge point and a second direction line for accumulation along a direction opposite to the gradient direction of the edge point,
wherein the operation of for each edge point, for each pixel point located in an accumulation region of the edge point, assigning a corresponding accumulation value to a matrix element in the initial matrix that is corresponding to the pixel point, to obtain an accumulation matrix, comprises:
calculating an absolute value of a deflection angle of each pixel point in the accumulation region from the first direction line for accumulation and an absolute value of a deflection angle of the pixel point from the second direction line for accumulation to obtain a first deflection angle and a second deflection angle respectively, and setting the smaller one of the first deflection angle and the second deflection angle as an accumulation angle of the pixel point;
obtaining an accumulation weight value corresponding to the pixel point based on the accumulation angle of the pixel point; and
obtaining the accumulation value of the pixel point based on the accumulation weight value and an accumulation reference value.

11. The image detection device according to claim 10, wherein the accumulation region comprises:
a first accumulation region with the first direction line for accumulation as a central line and with a deflection angle from the first direction line for accumulation that is less than or equal to a first angle threshold; and
a second accumulation region with the second direction line for accumulation as the central line and with a deflection angle from the second direction line for accumulation that is less than or equal to a second angle threshold.

12. The image detection device according to claim 10, wherein the operation of obtaining the accumulation weight value corresponding to the pixel point based on the accumulation angle of the pixel point comprises:
establishing a Gaussian function based on the accumulation angle of the pixel point; and
calculating the accumulation weight value corresponding to the pixel point based on the Gaussian function.

13. The image detection device according to claim 10, wherein the operation of determining positions of one or more circle-centers in the input image based on the accumulation matrix comprises:
obtaining one or more local extreme points of accumulation values in the accumulation matrix; and
determining the positions of one or more circle-centers in the input image based on the one or more local extreme points.

14. The image detection device according to claim 10, wherein the operation of determining the positions of one or more circle-centers in the input image based on the accumulation matrix further comprises:
comparing each accumulation value in the accumulation matrix with a circle-center detection threshold; and
determining one or more accumulation values greater than the circle-center detection threshold, and determining positions of one or more circle-centers in the input image based on the one or more accumulation values.

15. The image detection device according to claim 10, wherein the operation of determining one or more edge points in the input image comprises:
comparing a gradient value of each pixel point in the input image with an edge detection threshold; and
determining a pixel point whose gradient value is greater than the edge detection threshold as an edge point.

* * * * *